US012771998B2

(12) United States Patent
Rötz et al.

(10) Patent No.: US 12,771,998 B2
(45) Date of Patent: Oct. 20, 2026

(54) ENHANCED SOUND PERFORMANCE

(71) Applicant: Volvo Car Corporation, Gothenburg (SE)

(72) Inventors: Markus Rötz, Gothenburg (SE); Ralph Haddad, Gothenburg (SE); Jonatan Ewald, Västra Frölunda (SE)

(73) Assignee: Volvo Car Corporation, Gothenburg (SE)

( * ) Notice: Subject to any disclaimer, the term of this patent is extended or adjusted under 35 U.S.C. 154(b) by 153 days.

(21) Appl. No.: 18/967,841

(22) Filed: Dec. 4, 2024

(65) Prior Publication Data

US 2025/0184664 A1 Jun. 5, 2025

(30) Foreign Application Priority Data

Dec. 5, 2023 (EP) .................................... 23214404

(51) Int. Cl.
*H04R 3/04* (2006.01)
*G01S 11/14* (2006.01)
*H04R 3/12* (2006.01)
*H04W 4/80* (2018.01)

(52) U.S. Cl.
CPC ................ *H04R 3/04* (2013.01); *G01S 11/14* (2013.01); *H04R 3/12* (2013.01); *H04W 4/80* (2018.02); *H04R 2499/13* (2013.01)

(58) Field of Classification Search
CPC ........ H04R 3/04; H04R 3/12; H04R 2499/13; H04W 4/80; G01S 11/14
See application file for complete search history.

(56) References Cited

U.S. PATENT DOCUMENTS

2018/0063640 A1 3/2018 Lee
2024/0208406 A1* 6/2024 Shi ......................... B60Q 5/001

FOREIGN PATENT DOCUMENTS

CN 114885258 A 8/2022
EP 4234207 A2 8/2023
WO 2015123001 A1 8/2015

OTHER PUBLICATIONS

May 2, 2024 European Search Report issued in corresponding EP Application No. 23214404.

* cited by examiner

*Primary Examiner* — Andrew Sniezek
(74) *Attorney, Agent, or Firm* — Clements Bernard Walker; Christopher L. Bernard

(57) ABSTRACT

A method, performed by a vehicle audio system, for playing audio comprising receiving data for being output through at least an internal speaker mounted inside the vehicle and at least another speaker, wherein the at least another speaker comprises one of an external speaker mounted on an outside of the vehicle and another internal speaker mounted inside the vehicle, receiving first data comprising an indication that a target listening area is outside the vehicle, processing the data based on the first data; and controlling the at least internal speaker and the at least another speaker to output the processed data, wherein the data is processed such that a frequency response of an output of the at least external speaker and/or a frequency response of an output of the at least another speaker is adjusted for audio playing outside the vehicle.

15 Claims, 3 Drawing Sheets

ENHANCED SOUND PERFORMANCE

CROSS-REFERENCE TO RELATED APPLICATION

The current disclosure claims the benefit of priority of co-pending European Patent Application No. 23214404.8, filed on Dec. 5, 2023, the contents of which are incorporated in full by reference.

TECHNICAL FIELD

The current disclosure relates to a method for playing audio. The disclosure relates further to a vehicle audio system for playing audio and to a vehicle comprising such an apparatus.

BACKGROUND ART

Portable audio devices often have a limited performance in the low frequencies due to its limited size which does not provide a good sound quality. Increasing the size of the portable audio device could provide a better performance in the low frequencies but it would make cumbersome to transport the portable audio device.

SUMMARY

The disclosure relates to a method, by a vehicle audio system, for playing audio, comprising receiving data for being output through a portable audio device located outside a vehicle and one or more internal speakers mounted inside the vehicle, determining a distance and/or a position of the portable audio device with respect to the vehicle, processing the data based on the determined distance and/or position of the portable audio device and controlling the one or more internal speakers to output the processed data, wherein the data is processed such that a frequency response of an output of the one or more internal speakers is adjusted based on a frequency response of the portable audio device. This allows to use for audio playing the vehicle audio system together with the portable audio device. In this way, a higher dynamic range and broader frequency range can be achieved.

The portable audio device has a wireless connection to the vehicle and can playback music both as a portable audio device itself as well as a part of the vehicle audio system inside and outside of the vehicle. The vehicle audio system can be used to complement the low-frequency range of the portable audio device with the internal speakers of the vehicle. A microphone integrated in the portable audio device can be used to determine its position around the vehicle and optimize the audio performance as desired.

Determining the position and/or distance of the portable audio device may comprise outputting a first audio signal through the one or more internal speakers, receiving a second audio signal transmitted by the portable audio device as a response to the first audio signal, and determining the location and/or distance based on the first and second audio signals.

The location and/or distance may be determined based on a difference between a first time at which the first audio signal is transmitted and a second time at which the second audio signal is received.

In order to merge the internal speakers mounted on the vehicle with the portable audio device in the outside, the distance of the portable audio device to the internal speakers of the vehicle audio system needs to be known to apply the correct filters to the audio signal to be played. As said, to determine the position of the portable audio device, the portable audio device may comprise an integrated microphone. In this way, the tuning can be adapted to the current position of the portable audio device. This allows to improve the audio performance of the portable audio device at the outside of the vehicle.

Processing the audio data further may comprise applying a time delay to the data based on the determined location and/or distance. With more advanced dedicated filter tunings, the response of the vehicle audio system is synced with the portable audio device providing a much broader frequency range, higher dynamic range and a true hi-fi experience outside of the vehicle.

The method may further comprise establishing a connection between the vehicle audio system and the portable audio device. The connection may be established via a Bluetooth, a WiFi or an access network.

The vehicle audio system may comprise one or more filters and the frequency response of the output of the one or more internal speakers may be adjusted by selecting a filter among the one or more filters and/or creating a new filter, wherein the data may be processed based on the selected and/or new filter.

The frequency response of the output of the one or more internal speakers may be adjusted by selecting a configuration for the one or more selected filter and/or new filter, and the method may further comprise configuring the selected one or more filters and/or new filter and processing the data with the configured selected and/or new filter.

An area surrounding the vehicle may be divided into a plurality of sub-areas. Determining a position and/or distance of the portable audio device may comprise determining a current sub-area wherein the portable device is located among the plurality of sub-areas, and the data may be processed based on the current sub-area. The vehicle audio system may comprise a user interface such as a screen, voice interface or any other suitable user interface allowing a user to indicate the current sub-area.

The one or more speakers may comprise a plurality of speakers located at different positions inside of the vehicle, wherein the frequency response of the output of each of the plurality of speakers may be adjusted based on the determined distance or location of the portable audio device.

The frequency response may be adjusted based on pre-stored data comprising a plurality of filters, wherein each of the plurality of filters may be generated by measuring, during a calibration phase, a frequency response of the output of each of the one or more speakers at different positions around the vehicle. For instance, individual transfer functions from each internal speaker to the different positions around the vehicle may be measured during the calibration phase by placing microphones at the different positions. The measured transfer functions will show the performance of each internal speaker for each different position. The transfer function of the portable audio device may be also known. Based on that, filters for each position can be created which are then stored in the audio vehicle system and applied when audio is played back. In this way, several tuning profiles are provided to optimize the music playback to different positions of the portable audio device around the vehicle.

The disclosure further relates to a vehicle audio system comprising a memory connected to a controller, wherein the controller is configured to perform the method. The vehicle audio system may comprise the one or more internal speakers. The vehicle audio system may also comprise the portable audio device, and the portable audio device may comprise a receiver arranged to receive sound.

DETAILED DESCRIPTION

Figure 1A:
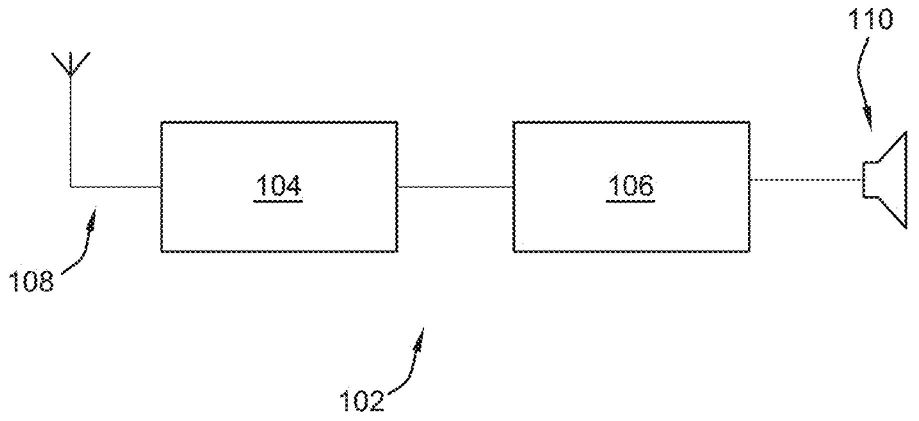
FIG. 1A illustrates a block diagram of a vehicle audio system according to the disclosure.

FIG. 1A illustrates a block diagram of a vehicle audio system 102 according to the disclosure. The vehicle audio system 102 may comprise a head unit 104, an amplifier 106, an antenna 108, and a plurality of speakers 110. The head unit 104 or the amplifier 106 may comprise a digital signal processing unit and a memory. The vehicle audio system 102 may transmit and receive information via Bluetooth, through a wireless communication network, for example, a 4G network, and/or using any other suitable communication technology. The antenna 110 may be arranged to transmit or receive information from a portable audio device. As said, the vehicle audio system 102 may comprise a plurality of speakers. One of the plurality of speakers of the vehicle audio system may be an internal speaker mounted inside of a vehicle wherein the vehicle audio system 102 is also installed. Optionally, the plurality of speakers may comprise an external speaker mounted on the outside of the vehicle. The vehicle audio system 102 may be configured to send data to the plurality of speakers and/or to the portable audio device wherein the data may be previously processed by the processing unit 104 to be played by the plurality of speakers and by the portable audio device based on a distance or location of the portable audio device with respect to the plurality of speakers. The portable audio device may further comprise also a digital signal processing unit to further process the data to be played.

Figure 2:
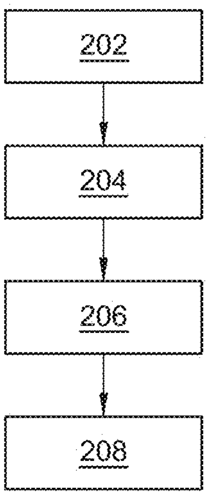
FIG. 2 illustrates a flowchart schematically depicting a method for playing audio according to the disclosure.

FIG. 2 illustrates a flowchart schematically depicting a method for playing audio according to the disclosure. The method of FIG. 2 may be performed by the vehicle audio system 102 of FIG. 1A.

In step 202 of the method, the vehicle audio system 102 receives data for being output through a portable audio device located outside a vehicle and one or more internal speakers mounted inside the vehicle.

In step 204, the vehicle audio system 102 determines a distance and/or a position of the portable audio device with respect to the vehicle.

In step 206, the data is processed based on the determined distance and/or position of the portable audio device.

In step 208, the vehicle audio system 102 controls the one or more internal speakers to output the processed data. The data is processed such that a frequency response of an output of the one or more internal speakers is adjusted based on a frequency response of the portable audio device.

Figure 1B:
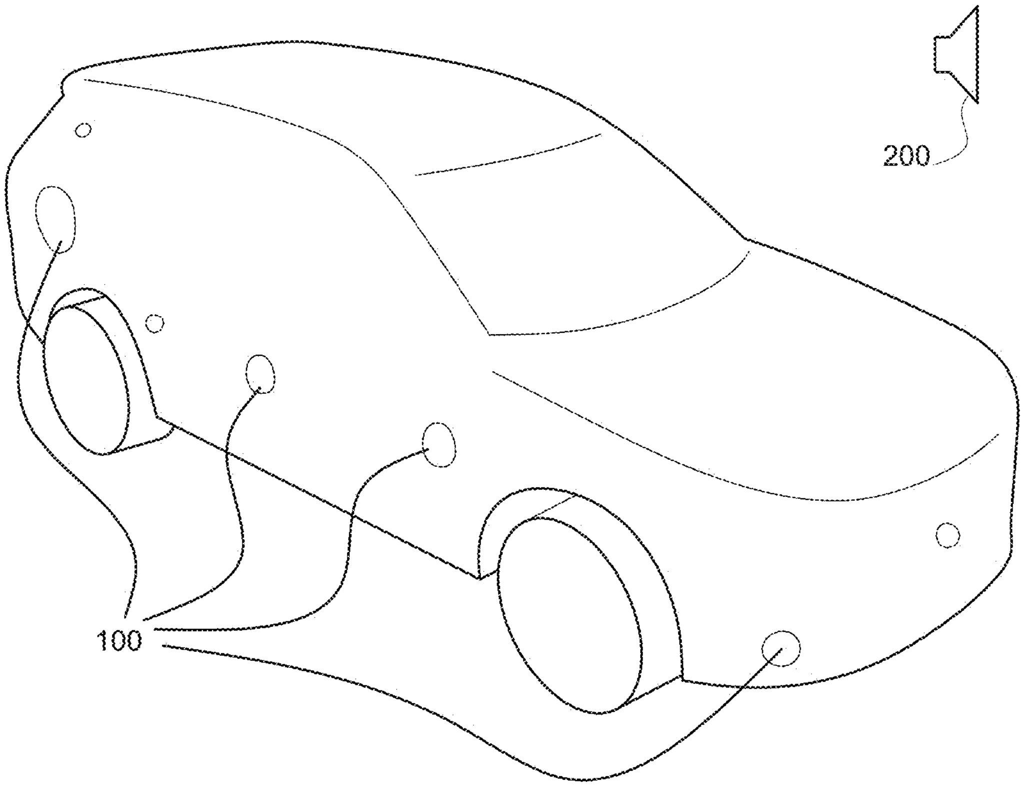
FIG. 1B illustrates a vehicle comprising the vehicle audio system of FIG. 1A.

The data maybe any kind of data that can be output by a speaker. The vehicle audio system 102 may comprise any number of speakers. FIG. 1B shows schematically a vehicle comprising a vehicle audio system according to the disclosure wherein the vehicle audio system can output audio through one or more internal speakers 100 mounted in different locations inside a cabin of the vehicle and through a portable audio device 200 outside of the vehicle at a certain location. This is a non-limiting example and the method of FIG. 2 can be used with any combination of speakers located in any part of the vehicle. For instance, the speakers 100 may be mounted in any of the doors, in the trunk, in the floor beneath the front and rear seat, in the footwell area, in the cowl area (under the windshield wipers), under the dashboard, on the outside of the firewall lower A-pillar area playing into the cabin of the vehicle, etc.

The portable audio device 200 has a wireless connection to the vehicle and can playback music both as a portable audio device itself as well as a part of the vehicle audio system inside and outside of the vehicle. The speakers 100 can be used to complement the low-frequency range of the portable audio device 200.

The position and/or distance of the portable audio device 200 may be determined in step 204 by outputting a first audio signal through the internal speakers 100 that will be received by the portable device 200. The portable device 200 will transmit a second audio signal as a response to the first audio signal which will be received by the speakers 100 and can be used to determine the location and/or distance of the portable audio device 200 in relation to the speakers 100. For instance, the location and/or distance may be determined based on a difference between a first time at which the first audio signal is transmitted and a second time at which the second audio signal is received.

Processing the data in step 206 may comprise applying a time delay to the data based on the determined location and/or distance. With more advanced dedicated filter tunings, the response of the vehicle audio system is synced with the portable audio device providing a much broader frequency range, higher dynamic range and a true hi-fi experience outside of the vehicle.

The method of FIG. 2 may comprise establishing a connection between the vehicle audio system and the portable audio device wherein the connection may be established via a Bluetooth, a WiFi or an access network.

The method may comprise in step 206 selecting a filter among one or more filters of the vehicle audio system or creating a new filter, and processing the data based on the selected or new filter. The frequency response of the output of the one or more internal speakers may be adjusted by selecting a configuration for the one or more selected filter and/or new filter, and the method may further comprise in step 206 configuring the selected one or more filters and/or new filter and processing the data with the configured selected and/or new filter.

An area surrounding the vehicle may be divided into a plurality of sub-areas and step 204 may comprise determining a current sub-area wherein the portable audio device 200 is located. Then in step 206, the data may be processed based on the current sub-area. The vehicle audio system may comprise a user interface such as a screen, voice interface or any other suitable user interface allowing a user to indicate the current sub-area where the portable audio device 200 is located.

The frequency response of the output of each of the one or more speakers may be adjusted based on the determined distance or location of the portable audio device.

The frequency response of the output of each of the one or more internal speakers may also be adjusted based on prestored data comprising a plurality of filters, wherein each of the plurality of filters may be generated by measuring, during a calibration phase, a frequency response of the output of each of the one or more internal speakers at different positions around the vehicle. For instance, individual transfer functions from each internal speaker to the different positions around the vehicle may be measured during the calibration phase by placing microphones at the different positions. The measured transfer functions will show the performance of each internal speaker for each different position. The transfer function of the portable audio device may be also known. Based on that, filters for each position can be created which are then stored in the audio vehicle system and applied when audio is played back. In this way, several tuning profiles are provided to optimize the music playback to different positions of the portable audio device around the vehicle. The filters may be stored in a memory of the vehicle audio system, in an external database that can be accessed by the vehicle audio system 102 or in any other suitable storage place.

Figure 3A:
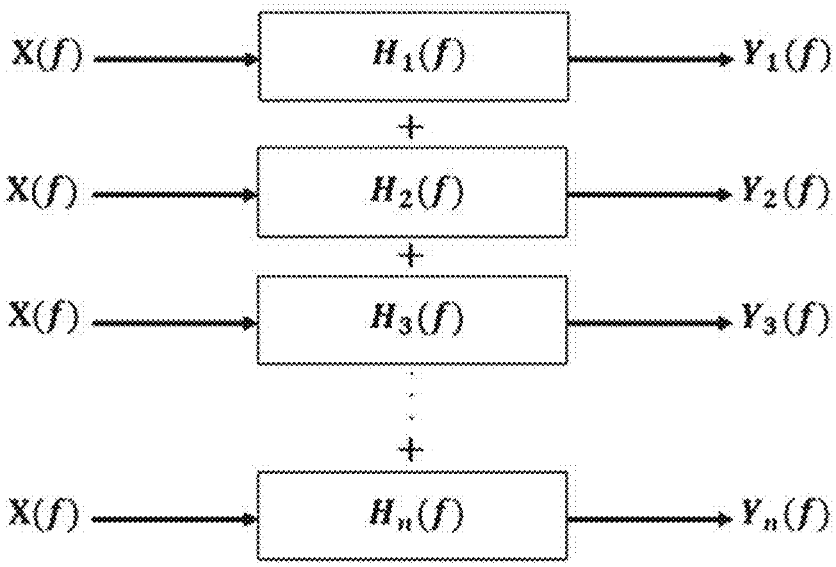
FIGS. 3A-3D illustrate an example of how to generate a new filters based on transfer functions for several speakers according to the disclosure.
Figure 3B:
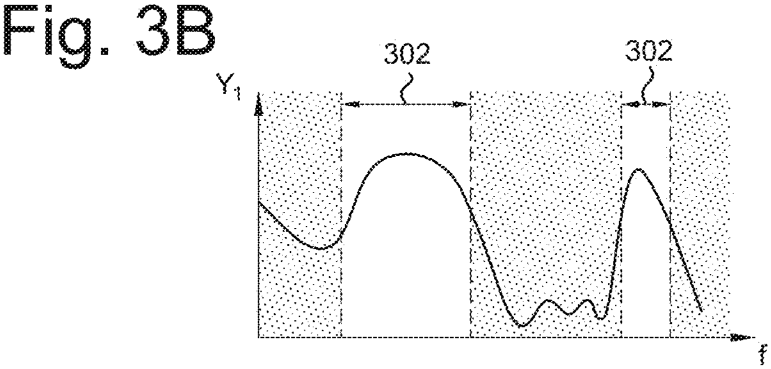
Figure 3C:
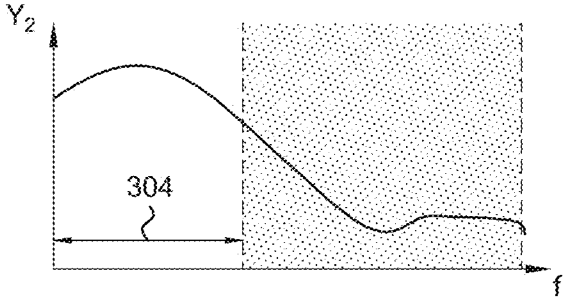
Figure 3D:
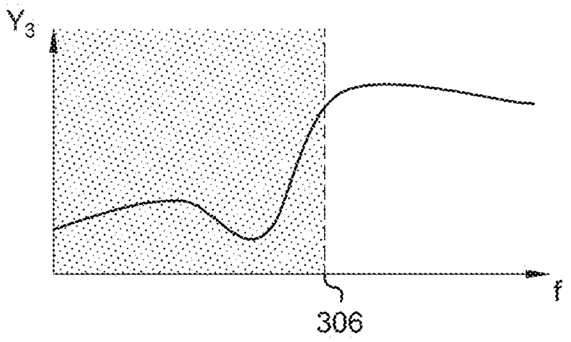
Figure 4A:
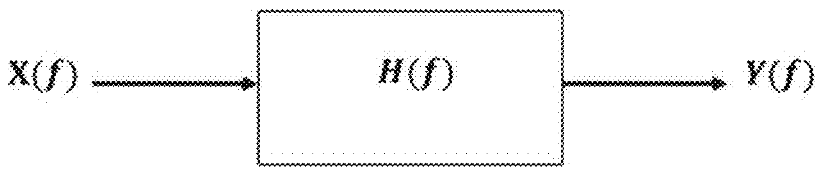
FIGS. 4A and 4B illustrate an example of how to generate a new filters based on transfer functions for several speakers according to the disclosure.
Figure 4B:
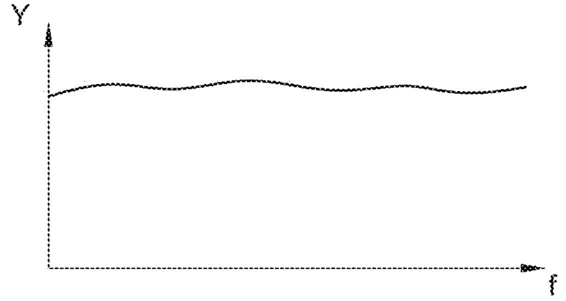

FIGS. 3A-3D and 4A-4B illustrate an example of how to generate filters for a different positions of the portable audio device based on transfer functions measured during a calibration phase for a number n of speakers according to the disclosure. During the calibration phase, each of the n speakers will output sound at different times and a microphone located in the different positions outside the vehicle will receive the output sound from each of the n speakers. In FIG. 3A, X(f) is a frequency representation of the signal to be output by each of the n speakers, $Y_k(f)$ is a frequency representation of the signal received at the microphone for the k speaker and $H_k(f)$ represents the transfer function for the k speaker wherein $H_k(f)=Y_k(f)/X_k(f)$ and k=1, . . . , n. FIGS. 3B-3D respectively show $Y_1(f)$, $Y_2(f)$ and $Y_3(f)$. As it can be appreciated from FIGS. 3B-3D, each of the n speakers might have a very different frequency response. Some of the n speakers will behave better in certain frequency ranges than others of the n speakers. The transfer function $H_k(f)$ can be adjusted by selecting the best frequency range for the corresponding k speaker. The best frequency range may be selected as the frequency range which has the best transmission to the outside of the vehicle such that, for a given input voltage, maximum output may be achieved, which may be determined by the sensitivity of the speaker installation. The best frequency range may be selected as a frequency range with higher amplitudes than other frequencies. Furthermore, the frequency ranges of several speakers may be selected in such a way that they complement each other as much as possible. For instance, in FIG. 3B, the frequency ranges 302 may be selected for the first speaker. In FIG. 3C, the frequency ranges 304 may be selected for the second speaker. And in FIG. 3C, the frequencies above frequency 306 may be selected for the third speaker. This operation of selecting the best frequency ranges may be performed for all the n speakers to created adjusted transfer functions $H'_k(f)$ by taking only the selected parts of each transfer function. A new transfer function H (f) may be created by combining all the adjusted transfer functions $H'_k(f)$. For instance, H (f) may be equal to $$\sum_{k=0}^{n} H'_k(f)$$

and, as shown in FIGS. 4A and 4B, by combining the adjusted transfer functions having the best frequency response, the output Y (f) resulting from the outputs of the n speakers has a broader frequency response than the outputs of the individual speakers. Filters corresponding to H (f) may be created then and stored associated to the corresponding position and/or distance. This calibration operation may be performed for several positions and/or distances such that a different set of filters is stored for each of these positions and/or distances and, when one of those positions and/or distances is where the portable device audio is located, the vehicle audio system 102 will process the data using the corresponding stored set of filters.

Those skilled in the art will appreciate that the methods, systems and components described herein may comprise, in whole or in part, a combination of analog and digital circuits and/or one or more appropriately programmed processors (e.g., one or more microprocessors including central processing units (CPU)) and associated memory, which may include stored operating system software, firmware and/or application software embodied in a non-transitory computer readable medium executable by the processor(s) for controlling operation thereof and/or for performing the particular algorithms represented by the various functions and/or operations described herein, including interaction between and/or cooperation with each other as well as transmitters and receivers. One or more of such processors, as well as other digital hardware, may be included in a single ASIC (Application-Specific Integrated Circuitry), or several processors and various digital hardware may be distributed among several separate components, whether individually packaged or assembled into a SoC (System-on-a-Chip).

Furthermore, the systems, methods and components described, and/or any other arrangement, unit, system, device or module described herein may for instance be implemented in one or several arbitrary nodes comprised in the host vehicle and/or one or more separate devices. In that regard, such a node may comprise an electronic control unit (ECU) or any suitable electronic device, which may be a main or central node. It should also be noted that the these may further comprise or be arranged or configured to cooperate with any type of storage device or storage arrangement known in the art, which may for example be used for storing input or output data associated with the functions and/or operations described herein. The systems, components and methods described herein may further comprise any computer hardware and software and/or electrical hardware known in the art configured to enable communication therebetween.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims.

The invention claimed is:

1. A method, performed by a vehicle audio system, for playing audio, comprising:

a. receiving data for being output through a portable audio device located outside a vehicle and one or more internal speakers mounted inside the vehicle;

b. determining a distance and/or a position of the portable audio device with respect to the vehicle;

c. processing the data based on the determined distance and/or position of the portable audio device; and d. controlling the one or more internal speakers to output the processed data;

e. wherein the data is processed such that a frequency response of an output of the one or more internal speakers is adjusted based on a frequency response of the portable audio device.

2. The method according to claim 1, wherein the determining the position and/or distance of the portable audio device comprises:

f. outputting a first audio signal through the one or more internal speakers;

g. receiving a second audio signal transmitted by the portable audio device as a response to the first audio signal; and h. determining the location and/or distance based on the first and second audio signals.

3. The method according to claim 2, wherein the location and/or distance is determined based on a difference between a first time at which the first audio signal is transmitted and a second time at which the second audio signal is received.

4. The method according to claim 2, wherein the processing the audio data further comprises applying a time delay to the data based on the determined location and/or distance.

5. The method according to claim 1, further comprising establishing a connection between the vehicle audio system and the portable audio device.

6. The method according to claim 5, wherein the connection is established via a Bluetooth, a WiFi or an access network.

7. The method according to claim 1, wherein the vehicle audio system comprises one or more filters and the frequency response of the output of the one or more internal speakers is adjusted by selecting a filter among the one or more filters and/or creating a new filter, and wherein the data is processed based on the selected and/or new filter.

8. The method according to claim 7, wherein the frequency response of the output of the one or more internal speakers is adjusted by selecting a configuration for the one or more selected filter and/or new filter, and wherein the method further comprises configuring the selected one or more filters and/or new filter and processing the data with the configured selected and/or new filter.

9. The method according to claim 1, wherein an area surrounding the vehicle is divided into a plurality of sub-areas, wherein the determining the position and/or distance of the portable audio device comprises determining a current sub-area wherein the portable device is located among the plurality of sub-areas, and wherein the data is processed based on the current sub-area.

10. The method according to claim 1, wherein the one or more internal speakers comprise a plurality of speakers located at different positions inside of the vehicle, and wherein the frequency response of the output of each of the one or more internal speakers is adjusted based on the determined distance or location of the portable audio device.

11. The method according to claim 1, wherein the frequency response is adjusted based on prestored data comprising a plurality of filters, and wherein each of the plurality of filters is generated by measuring, during a calibration phase, a frequency response of the output of each of the one or more internal speakers at different positions around the vehicle.

12. A vehicle audio system comprising a memory connected to a controller, wherein the controller is configured to perform the method comprising:

i. receiving data for being output through a portable audio device located outside a vehicle and one or more internal speakers mounted inside the vehicle;

j. determining a distance and/or a position of the portable audio device with respect to the vehicle;

k. processing the data based on the determined distance and/or position of the portable audio device; and l. controlling the one or more internal speakers to output the processed data;

wherein the data is processed such that a frequency response of an output of the one or more internal speakers is adjusted based on a frequency response of the portable audio device.

13. The vehicle audio system according to claim 12, further comprising the one or more internal speakers.

14. The vehicle audio system according to claim 12, further comprising the portable audio device, wherein the portable audio device comprises a receiver arranged to receive sound.

15. A vehicle, comprising:

m. a vehicle audio system comprising a memory connected to a controller, wherein the controller is configured to perform the method comprising:

i. receiving data for being output through a portable audio device located outside a vehicle and one or more internal speakers mounted inside the vehicle;

ii. determining a distance and/or a position of the portable audio device with respect to the vehicle;

iii. processing the data based on the determined distance and/or position of the portable audio device; and iv. controlling the one or more internal speakers to output the processed data;

v. wherein the data is processed such that a frequency response of an output of the one or more internal speakers is adjusted based on a frequency response of the portable audio device.

* * * * *